(12) United States Patent
Laxton et al.

(10) Patent No.: US 12,379,575 B2
(45) Date of Patent: Aug. 5, 2025

(54) DIGITAL ADAPTIVE OPTICS ENCODER MODULE

(71) Applicant: Naval Information Warfare Center Pacific, San Diego, CA (US)

(72) Inventors: Benjamin Laxton, San Diego, CA (US); Kyle Drexler, San Diego, CA (US); Skylar D. Lilledahl, El Cajon, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 516 days.

(21) Appl. No.: 17/873,333

(22) Filed: Jul. 26, 2022

(65) Prior Publication Data

US 2024/0036295 A1 Feb. 1, 2024

(51) Int. Cl.
*G02B 23/00* (2006.01)
*G01D 5/347* (2006.01)
*G02B 13/02* (2006.01)
*G02B 23/16* (2006.01)
*G02B 27/10* (2006.01)
*G02B 27/12* (2006.01)
*G02B 27/14* (2006.01)

(52) U.S. Cl.
CPC ......... *G02B 13/02* (2013.01); *G01D 5/34794* (2021.05); *G02B 23/145* (2013.01); *G02B 23/16* (2013.01); *G02B 27/12* (2013.01); *G02B 27/14* (2013.01)

(58) Field of Classification Search
CPC ........ G02B 23/00; G02B 23/02; G02B 23/04; G02B 23/06; G02B 23/10; G02B 23/105; G02B 23/12; G02B 23/14; G02B 23/16; G02B 23/24; G02B 23/2407; G02B 23/2446; G02B 23/2476; G02B 23/2484
USPC ................... 359/399–430, 618–640
See application file for complete search history.

(56) References Cited

U.S. PATENT DOCUMENTS

| | | | | |
|---|---|---|---|---|
| 4,619,508 A | * | 10/1986 | Shibuya | G02B 19/0047 353/38 |
| 6,922,430 B2 | * | 7/2005 | Biswas | G02B 27/108 372/100 |
| 7,109,435 B2 | * | 9/2006 | Tsukihara | B23K 26/0608 219/121.76 |

(Continued)

*Primary Examiner* — Thong Q Nguyen
(74) *Attorney, Agent, or Firm* — Naval Information Warfare Center Pacific; Kyle Eppele; Paul C. Oestreich

(57) ABSTRACT

A digital adaptive optics encoder module includes an input mounting flange, a collimating lens, a bandpass filter, digital adaptive optic elements, refocusing lens, an output mounting flange, and a housing. The input mounting flange is capable of attaching to a telescope. The collimating lens is capable of expanding light from a target to fill a plurality of primary apertures. The bandpass filter has a bandwidth ranging from about 40 nm to about 100 nm. The digital adaptive optic elements include the plurality of primary apertures, an optical spreader, a focusing optic, and a detector. The refocusing lens is capable of refocusing an output from the digital adaptive optic elements onto a sensor plane. The output mounting flange is capable of attaching to an output connection. The housing encloses all of the interior components of the digital adaptive optics encoder module.

20 Claims, 6 Drawing Sheets

(56) References Cited

U.S. PATENT DOCUMENTS

| | | | |
|---|---|---|---|
| 7,164,523 B2 * | 1/2007 | Ishii | G02B 27/0025 359/290 |
| 2018/0249100 A1 | 8/2018 | Watson et al. | |

* cited by examiner

DIGITAL ADAPTIVE OPTICS ENCODER MODULE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. Licensing and technical inquiries may be directed to the Office of Research and Technical Applications, Naval Information Warfare Center Pacific, Code 72120, San Diego, CA, 92152; (619) 553-5118; ssc_pac_t2@navy.mil. Reference Navy Case Number 210287.

BACKGROUND

Light propagating through the Earth's atmosphere encounters atmospheric turbulence, which causes dynamic temperature and pressure fluctuations, and these fluctuations randomly vary the index of refraction throughout the Earth's atmosphere. Thus, light propagating through the Earth's atmosphere collects wavefront phase errors that degrade imaging performance through the atmospheric turbulence when compared to a homogenous environment such as the vacuum of space. This effect is particularly pronounced in astronomic telescope applications, but similar degradations may occur in other scenarios such as terrestrial telephoto imaging and airborne surveillance. A number of techniques are used to correct imaging distortion. For example, wavefront sensors (e.g., Shack-Hartmann wavefront sensor) with a beacon, one or more adaptive mirrors, and real-time digital processing compose the traditional adaptive optics techniques employed on many astronomy telescopes. Additionally, there are post-processing techniques that attempt to correct imaging distortion. These may include methods that build up temporal statistics of scene fluctuations or methods that attempt to estimate a blur kernel from a single image.

SUMMARY OF THE INVENTION

An embodiment of a digital adaptive optics encoder module is disclosed. The embodiment of a digital adaptive optics encoder module may include an input mounting flange, wherein the input mounting flange is a mount capable of attaching to a telescope; a collimating lens, wherein the collimating lens is capable of expanding light from a target to fill a plurality of primary apertures; a bandpass filter having a bandwidth ranging from about 40 nm to about 100 nm; digital adaptive optic elements, wherein the digital adaptive optic elements include: i) the plurality of primary apertures for receiving light from the collimating lens; ii) an optical spreader for spreading apart the light passing through the primary apertures by at least a factor of two times a baseline separation of the primary apertures, wherein the optical spreader includes a plurality of actuators for modifying path lengths within the digital adaptive optic elements through the primary apertures to a detector; iii) a focusing optic for focusing the light from the optical spreader at the detector; and iv) the detector for detecting an image of the target with the light from the focusing optic; refocusing lens, wherein the refocusing lens is capable of refocusing an output from the digital adaptive optic elements onto a sensor plane; output mounting flange, wherein the output mounting flange is a mount capable of attaching to an output connection; and a housing, wherein the housing encloses the collimating lens, the bandpass filter, the digital adaptive optic encoder elements, and the refocusing lens.

An embodiment of a digital adaptive optics encoder module is disclosed. The embodiment of a digital adaptive optics encoder module may include a telescope for receiving target light; an input mounting flange attached to the telescope; a collimating lens, wherein the collimating lens is capable of expanding the target light to fill a plurality of primary apertures; a bandpass filter, having a bandwidth ranging from about 40 nm to about 100 nm, for receiving the expanded target light and outputting bandpass light; digital adaptive optic elements for receiving bandpass light, wherein the digital adaptive optic elements include: i) the plurality of primary apertures for receiving the bandpass light; ii) an optical spreader for spreading apart the light passing through the primary apertures by at least a factor of two times a baseline separation of the primary apertures, wherein the optical spreader includes a plurality of actuators for modifying path lengths within the digital adaptive optic elements through the primary apertures to a detector; iii) a focusing optic for focusing the light from the optical spreader at the detector; and iv) the detector for detecting an image of the target from the focusing optic; a refocusing lens, wherein the refocusing lens is capable of refocusing an output from the digital adaptive optic elements onto a sensor plane; an output mounting flange, wherein the output mounting flange is a mount capable of attaching to an output connection; and a housing, wherein the housing encloses the collimating lens, the bandpass filter, the digital adaptive optic encoder elements, and the refocusing lens.

An embodiment of a digital adaptive optics encoder module is disclosed. The embodiment of a digital adaptive optics encoder module may include an input mounting flange, wherein the input mounting flange is a mount capable of attaching to a telescope; a first relay lens, wherein the first relay lens adjusts a scale of an input aperture diameter by demagnifying the target to fill an input aperture of the digital adaptive optic elements; a collimating lens, wherein the collimating lens is capable of expanding light from the first relay lens to fill a plurality of primary apertures; a bandpass filter for receiving light from the collimating lens having a bandwidth ranging from about 40 nm to about 100 nm; digital adaptive optic elements for receiving light from the bandpass filter, wherein the digital adaptive optic elements include: i) the plurality of primary apertures for receiving light from the target; ii) an optical spreader for spreading apart the light passing through the primary apertures by at least a factor of two times a baseline separation of the primary apertures, wherein the optical spreader includes a plurality of actuators for modifying path lengths within the digital adaptive optic elements through the primary apertures to a detector; iii) a focusing optic for focusing the light from the optical spreader at the detector; and iv) the detector for detecting an image of the target with the light from the focusing optic; a refocusing lens, wherein the refocusing lens is capable of refocusing an output from the digital adaptive optic elements onto a sensor plane; a second relay lens for receiving light from the refocusing lens, wherein the second relay lens matches or exceeds the input aperture diameter of the digital adaptive optics encoder module; an output mount flange, wherein the output mounting flange is a mount capable of attaching to an output connection; and a housing, wherein the housing encloses the first relay lens, the collimating lens, the bandpass filter, the digital adaptive optic encoder elements, the refocusing lens, and the second relay lens.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Correcting atmospheric turbulence or image distortion is a persistent challenge for long-range imaging systems. Adaptive optics techniques include LASER guide stars and wavefront sensors (e.g., Shack-Hartmann wavefront sensor) combined with post processing techniques, such as methods that build up temporal statistics of scene fluctuations or methods that attempt to estimate a blur kernel from a single image. In both cases, without a known beacon or target object in the scene, the blur kernel is only a statistical estimate and the estimated blur is removed through various deconvolution methods. However, none of these devices combined with the post processing techniques are modular. Currently, most adaptive optics techniques are built into the imaging system, unable to be used in other systems without dismantling or destroying the original imaging system, and rely on additional hardware being added to the system. As a result, a new system that can be combined with the post processing techniques needs to be prepared for each imaging system or additional hardware has to be added to the system, which can be costly and inefficient.

In the digital adaptive optics encoder module herein, is a self-contained module that is capable of attaching and being used with many different imaging systems. When the digital adaptive optics encoder module is added to a system, the module does not rely on additional hardware being added. As a result, the digital adaptive optics encoder module is cheaper and more efficient because the module can be reused with different imaging lenses rather than being remade or modified for each specific application. Additionally, the modularity allows different modules to be attached to the digital adaptive optics encoder module for different applications making the module more versatile than traditional imaging systems. This is possible because the digital adaptive optics encoder module combines aspects of both the traditional and purely post processing techniques into a modular device that is capable of being used in multiple imaging systems.

The digital adaptive optics encoder module herein includes an input mounting flange, a collimating lens, a bandpass filter, digital adaptive optic elements, refocusing lens, an output mounting flange, and a housing. The input mounting flange is capable of attaching to a telescope. The collimating lens is capable of expanding light from a target to fill a plurality of primary apertures. The bandpass filter has a bandwidth ranging from about 40 nm to about 100 nm. The digital adaptive optic elements include the plurality of primary apertures, an optical spreader, a focusing optic, and a detector. The refocusing lens is capable of refocusing an output from the digital adaptive optic elements onto a sensor plane. The output mounting flange is capable of attaching to an output connection. The housing encloses all of the interior components of the digital adaptive optics encoder module.

Figure 1:
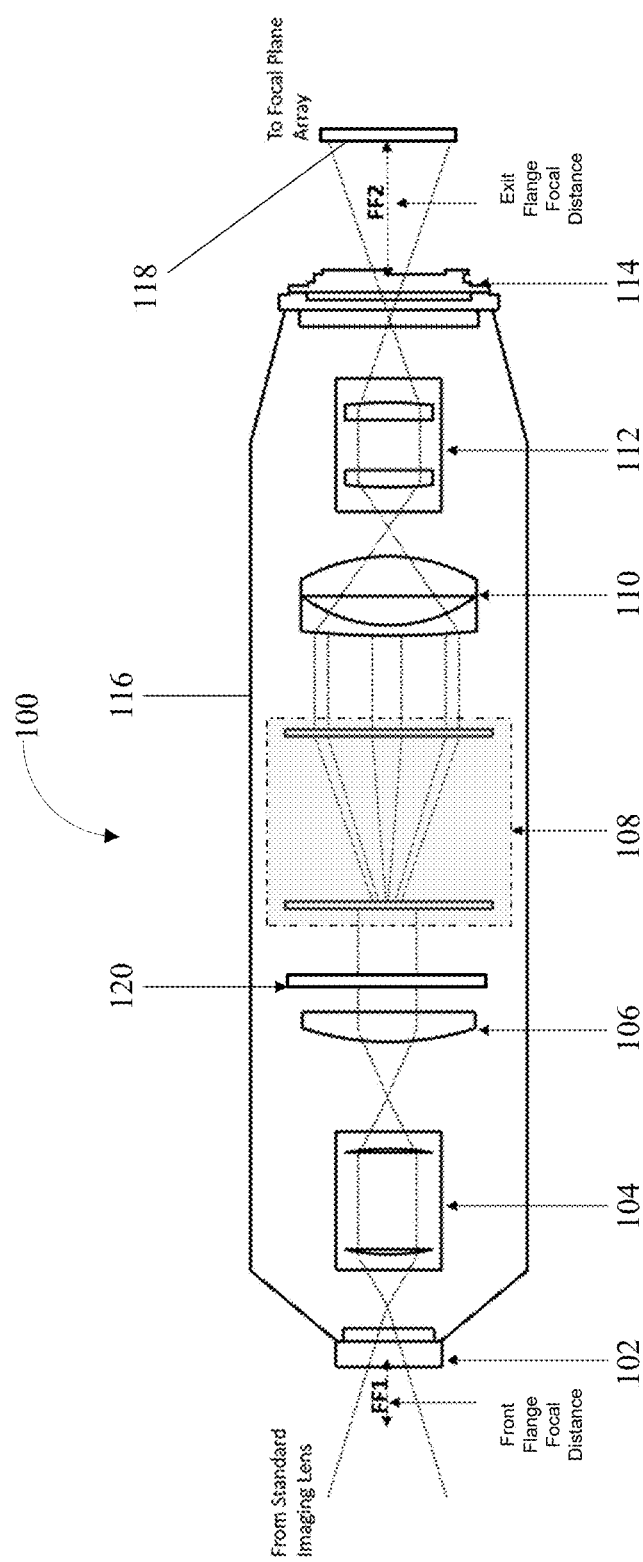
FIG. 1 is a cross-sectional view of an example of the digital adaptive optics encoder module disclosed herein.

Referring now to FIG. 1, an example of a digital adaptive optics encoder module 100 is shown. FIG. 1 is for illustrative purposes only to aid in viewing and should not be construed as being limiting or directed to a particular material or materials. The digital adaptive optics encoder module 100 includes an input mounting flange 102 that is a mount capable of attaching to a telescope. Any lens mounting standard may be used for the input mounting flange 102. In some examples, the input mounting flange 102 may be a T-mount, a C-mount, a K-mount, a S-mount, a D-mount, or a PL-mount. Any telescope system may be attached to the input mounting flange 102 (e.g., telescope, photographic lens, etc.) that matches the distance from the collimating lens 106 (discussed in detail below) to the input mounting flange 102. In an example, the telescope may be a telephoto zoom lens that has a focal length ranging from about 900 mm to about 2100 mm.

Referring back to FIG. 1, the digital adaptive optics encoder module 100 includes a first relay lens 104. In some examples, the digital adaptive optics encoder module 100 has no relay lens 104. In other examples, the digital adaptive optics encoder module 100 includes only a first relay lens 104. An example of the first relay lens 104 as shown in FIG. 1. The first relay lens 104 is located between the input mounting flange 102 and the collimating lens 106. The first relay lens 104 assists with expanding light to fill a plurality of primary apertures discussed in detail herein. The first relay lens 104 is any lens that can adjust the scale of the input aperture size, or diameter, by demagnifying a target to fill the digital adaptive optic elements 108. The target is a predetermined light source during a calibration cycle of the digital adaptive optics encoder module 100 and an external light source during normal operation of the digital adaptive optics encoder module 100.

Referring back to FIG. 1, the digital adaptive optics encoder module 100 also includes a collimating lens 106. The collimating lens 106 also assists with expanding light from the target to fill a plurality of primary apertures discussed in detail herein. The collimating lens 106 may be any plano convex lens that expands light to fill the plurality of primary apertures. In an example, the collimating lens is a 200 mm lens with a 3-inch diameter. In another example, the collimating lens 106 is a 100 mm lens with a 25 mm diameter.

The digital adaptive optics encoder module 100 also includes a bandpass filter 120. The bandpass filter 120 allows specific wavelengths of light to pass from the collimating lens 106 into the digital adaptive optic elements 108. The bandpass filter 120 may be a bandpass filter 120 centered on any nominal wavelength and bandwidth depending on the sensor being used in the output connection discussed in detail herein. In an example, the bandpass filter 120 is centered at a nominal wavelength of about 632 nm and has a bandwidth ranging from about 40 nm to about 100 nm.

Referring back to FIG. 1, the digital adaptive optics encoder module 100 further includes digital adaptive optic elements 108. The digital adaptive optic elements 108 remove image distortions from a target that cause interference making the image. The digital adaptive optic elements 108 include a plurality of primary apertures 201, 202, 203, an optical spreader 208 for spreading apart the light passing through the plurality of primary apertures 201, 202, 203, a focusing optic 218, and a detector 220. The digital adaptive optic elements 108 are discussed in detail herein.

Figure 2:
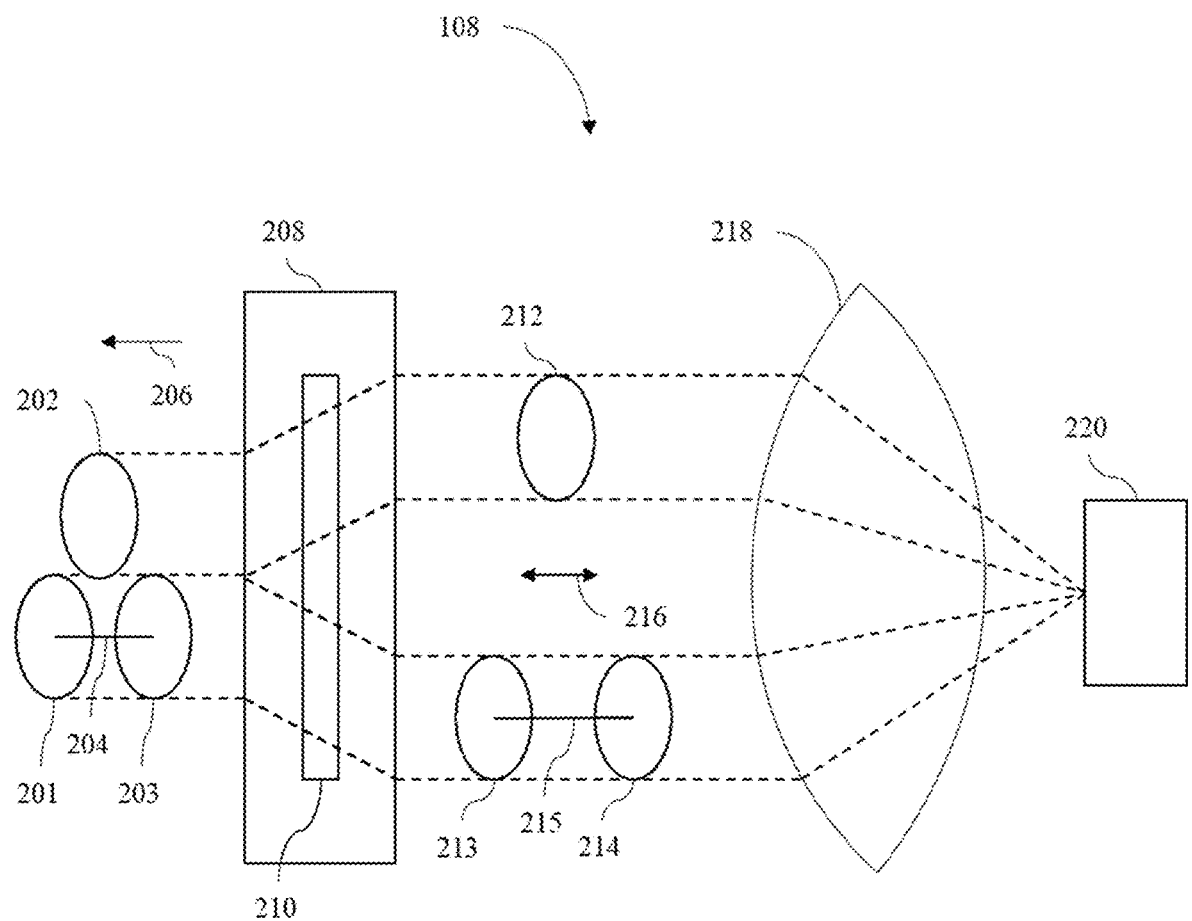
FIG. 2 is a block diagram of an example of the digital adaptive optic elements within the digital adaptive optics encoder module disclosed herein.

Referring to FIG. 2, the digital adaptive optic elements 108 include a plurality of primary apertures 201, 202, 203 for receiving light from a target. In this example, there are three primary apertures 201, 202, 203. Three primary apertures 201, 202, 203 is a typical minimum number of apertures because this enables quantifying and counteracting the piston, tip, and tilt induced from the atmospheric distortion. In other examples, there may be two or more apertures. In examples, where there are more than three apertures, the apertures quantify and counteract higher modes of atmospheric distortion.

An optical spreader 208 spreads apart the light passing through the primary apertures 201, 202, 203 by at least a factor of two times a baseline separation 204 of the primary apertures 201, 202, 203. Therefore, the baseline separation 215 of the secondary apertures 212, 213, 214 is at least a factor of two times a baseline separation 204 of the primary apertures 201, 202, 203. If the primary apertures 201, 202, 203 are circular and abut without much space between them, then the baseline separation 204 equals the diameter of each of the primary apertures 201, 202, 203, and baseline separation 215 of the secondary apertures 212, 213, 214 is at least twice the diameter of the primary apertures 201, 202, 203.

In the example shown in FIG. 2, the three primary apertures 201, 202, 203 the primary aperture 201 is spread radially away from symmetry axis 216 to yield secondary aperture 213, primary aperture 203 is spread radially away from symmetry axis 216 to yield secondary aperture 214, and primary aperture 202 is spread radially away from symmetry axis 216 to yield secondary aperture 212. In general, regardless of the number of primary apertures 201, 202, 203 the spreading includes both radial and circumferential components that arrange the secondary apertures 212, 213, 214 in a non-redundant array. For the three primary apertures 201, 202, 203 non-redundant means the centers of the three secondary apertures 212, 213, 214 are not collinear. Typically, the non-redundant array of the secondary apertures 212, 213, 214 is arranged as far as possible from any redundancy, which is achieved for the three secondary apertures 212, 213, 214 when their centers are arranged at the vertices of an equilateral triangle.

The focusing optic 218, such as a lens, focuses the light from the optical spreader 208 at the detector 220. The focusing optic 218 generates an image of the target at the detector 220, and the image at the detector 220 is a Fourier transform of the light passing through the secondary apertures 212, 213, 214, especially when the target is far away in direction 206. The detector 220 detects the image of the target with the light from the focusing optic 218.

The optical spreader 208 spreads apart the light passing through the primary apertures 201, 202, 203 by at least a factor of two times the baseline separation 204 into a non-redundant array of the secondary apertures 212, 213, 214, the modulation transfer function (MTF) of the secondary apertures 212, 213, 214 do not overlap at the detector 220. Therefore, the contribution of each of the primary apertures 201, 202, 203 can be determined from the image of the target at the detector 220 due to the optical spreader 208.

The light passing through a pairing of primary apertures 201, 203 produces a respective interference pattern superimposed on the image of the target at detector 220. The respective interference pattern for the pairing of primary apertures 201, 203 includes fringes nominally running roughly perpendicular to the baseline separation 215 of the secondary apertures 213, 214. The other pairings of primary apertures 201, 202 and of primary apertures 202, 203 similarly produce respective interference patterns. Therefore, the image of the target at detector 220 is an image of the target with superimposed and interleaved fringes of respective interference patterns. Because the optical spreader 208 spreads apart the light passing through the primary apertures 201, 202, 203 by at least the factor of two, for every pairing of two of the primary apertures 201, 202, 203, the respective interference pattern for the pairing has distinct spatial frequencies, and hence separable spatial frequencies. The respective interference patterns for the pairings of the primary apertures 201, 202, 203 occur even when the light received from the target is incoherent light.

However, the interference patterns occur only when the path lengths are matched within the digital adaptive optic elements 108. An imaged bandwidth at the detector 220 is typically 3% to 10% of the imaged wavelength, and this puts an upper bound on the coherence length at 30 to 10 wavelengths, unless the target emits monochromatic light within the bandwidth. However, a more typical coherence length is three wavelengths of light. Hence, the interference patterns occur only when the path lengths are matched within a few wavelengths of light. The digital adaptive optic elements 108 herein include actuators 210, which during automatically repeated calibration cycles match the path lengths despite dynamically varying environmental conditions. With matched path lengths, the resulting interference patterns enable quantifying and counteracting the atmospheric distortion. Therefore, examples of the digital adaptive optic elements 108 include actuators 210 for modifying and matching the path lengths within the digital adaptive optic elements 108 through the primary apertures 201, 202, 203 to the detector 220.

The path lengths are matched when, for every pairing of two of the primary apertures 201, 202, 203 and in an absence of atmospheric distortion between the target and digital adaptive optic elements 108, the light passing through the pairing of the primary apertures 201, 202, 203 has optically equal path lengths from a respective point of the target to a corresponding point in the image of the target at the detector 220, with the respective point for the pairing of the primary apertures 201, 202, 203 imaged into the corresponding point in the image. Note that with atmospheric distortion optically equal path lengths does not imply path lengths spanning equal distances because, for example, the average index of refraction from the target to primary aperture 201 may differ from the average index of refraction from the target to primary aperture 203. This describes a piston distortion, which is detected and corrected by the digital adaptive optics encoder module 100 herein.

In the specific example in FIG. 2, the digital adaptive optic elements 108 include three circular apertures 201, 202, 203 surrounding a symmetry axis 216. The optical spreader 208 transposes the light passing through each of the three circular apertures 201, 202, 203 radially away from the symmetry axis 216 by at least the factor of two times the baseline separation 204. The baseline separation 204 equals a diameter of each of the three circular apertures 201, 202, 203. The optical spreader 208 transposes the light into a non-redundant array of secondary apertures 212, 213, 214. Actuators 210 modify the path lengths within the digital adaptive optic elements 108 through the primary apertures 201, 202, 203 to the detector 220. Example actuators 210 include liquid crystal layers inserting a variable phase delay along the path lengths within the digital adaptive optic elements 108, piezoelectric transducers driving reflective diffractive optical elements, and piezoelectric transducers driving folding mirrors along the path lengths within the digital adaptive optic elements 108. The focusing optic 218 is a lens for focusing the light from the optical spreader 208 and the secondary apertures 212, 213, 214 at the detector 220. The detector 220 is a pixelated detector for detecting the image, which is a two dimensional image of the target, with the light from the lens.

Referring back to FIG. 1, the digital adaptive optics encoder module 100 additionally includes a refocusing lens 110. The refocusing lens is capable of refocusing an output from the digital adaptive optic elements 108 onto a sensor plane 118, depicted as a surface of a rectangle in FIG. 1 of an externally mounted sensor module, camera module, data acquisition module, or any other module that is attached to the output mounting flange 114 discussed in detail herein. FIG. 1 also illustrates an inherent front flange focal distance FF1 and an inherent exit flange focal distance FF2 which are both industry standard distances. In some examples, the refocusing lens 110 is capable of providing equal to or less than 4× magnification on the interference pattern collected on the sensor plane 118, which, in some examples, provides the pixel resolution required to perform the computations. The refocusing lens 110 may be any lens that matches the diameter of the output aperture of the digital adaptive optics encoder module 100. In an example, the refocusing lens 110 is a 1-inch diameter plano-concave lens with a −75 mm focal length.

Referring now to FIG. 1, the digital adaptive optics encoder module 100 may include a second relay lens 112. In some examples, the digital adaptive optics encoder module 100 has no second relay lens 112. In other examples, the digital adaptive optics encoder module 100 has a second relay lens 112 only without a first relay lens 104. In another example, the digital adaptive optics encoder module 100 includes both a first relay lens 104 and a second relay lens 112. The second relay lens 112 is located between the refocusing lens 110 and the output mounting flange 114. The second relay lens 112 assists with directing light to the focal plane, or sensor plane 118, of a sensor mounted in any module that is attached to the output mounting flange 114. In an example, the second relay lens 112 is any lens that matches or exceeds the input aperture diameter of the digital adaptive optics encoder module 100. In another example, the second relay lens 112 is the same as the first relay lens 104.

Referring back to FIG. 1, the digital adaptive optics encoder module 100 includes an output mounting flange 114. The output mounting flange 114 is capable of attaching to an output connection. Any lens mounting standard may be used for the output mounting flange 114. In some examples, the output mounting flange 114 may be a T-mount, a C-mount, a K-mount, a S-mount, a D-mount, or a PL-mount. In some examples, the output mounting flange 114 is the same as the input mounting flange 102. In other examples, the output mounting flange 114 is a different mount than the input mounting flange 102.

The output connection may be anything that can attach to the output mounting flange 114. The output connection includes a processing module that can process the incoming imaging data and create a digital image (i.e., digitize the incoming light) of the target. In an example, the processing module may be a standalone device capable of processing and digitizing the target or the processing module may be part of a computer processor. In addition to the processing module, the output connection may also include an output connection module. Some examples of the output connection module include a camera module, a data acquisition module, a sensor module, a focusing element module, and combinations thereof. In an example, when a sensor module is used, the sensor module records the raw intensity of the target (i.e., incoming light) and stores the raw intensity of the target as data in RAM or long term storage (e.g., HDD or SSD). In another example, when a data acquisition module is used, the data acquisition module includes a computer processor that can save raw data, perform diagnostic analysis, perform the reconstruction of the digitized frame, or a combination thereof. Regardless of the type of output connection module used, a computer is connected wirelessly to the processing module or wired directly to the processing module to digitally process the incoming target to generate a digital image.

Referring to FIG. 1, the digital adaptive optics encoder module 100 also includes a housing 116 that encloses all of the interior components of the digital adaptive optics encoder module 100. In one example, the housing 116 encloses the collimating lens 106, the bandpass filter 120, the digital adaptive optic encoder elements 108, and the refocusing lens 110. In another example, the housing 116 encloses the first relay lens 104 (when used in the module 100), the collimating lens 106, the bandpass filter 120, the digital adaptive optic encoder elements 108, and the refocusing lens 110, and the second relay lens 112 (when used in the module 100). The housing 116 may be any material that is capable of protecting all of the interior components of the digital adaptive optics encoder module 100. In an example, the housing 116 may be polyvinyl chloride (PVC). In an example, the housing 116 may taper at the on either side to match the diameter of the input mounting flange 102 or output mounting flange 114 as shown in FIG. 1. In another example, the housing 116 may be the same diameter around the digital adaptive optics encoder module 100 as shown in FIG. 3.

Figure 3:
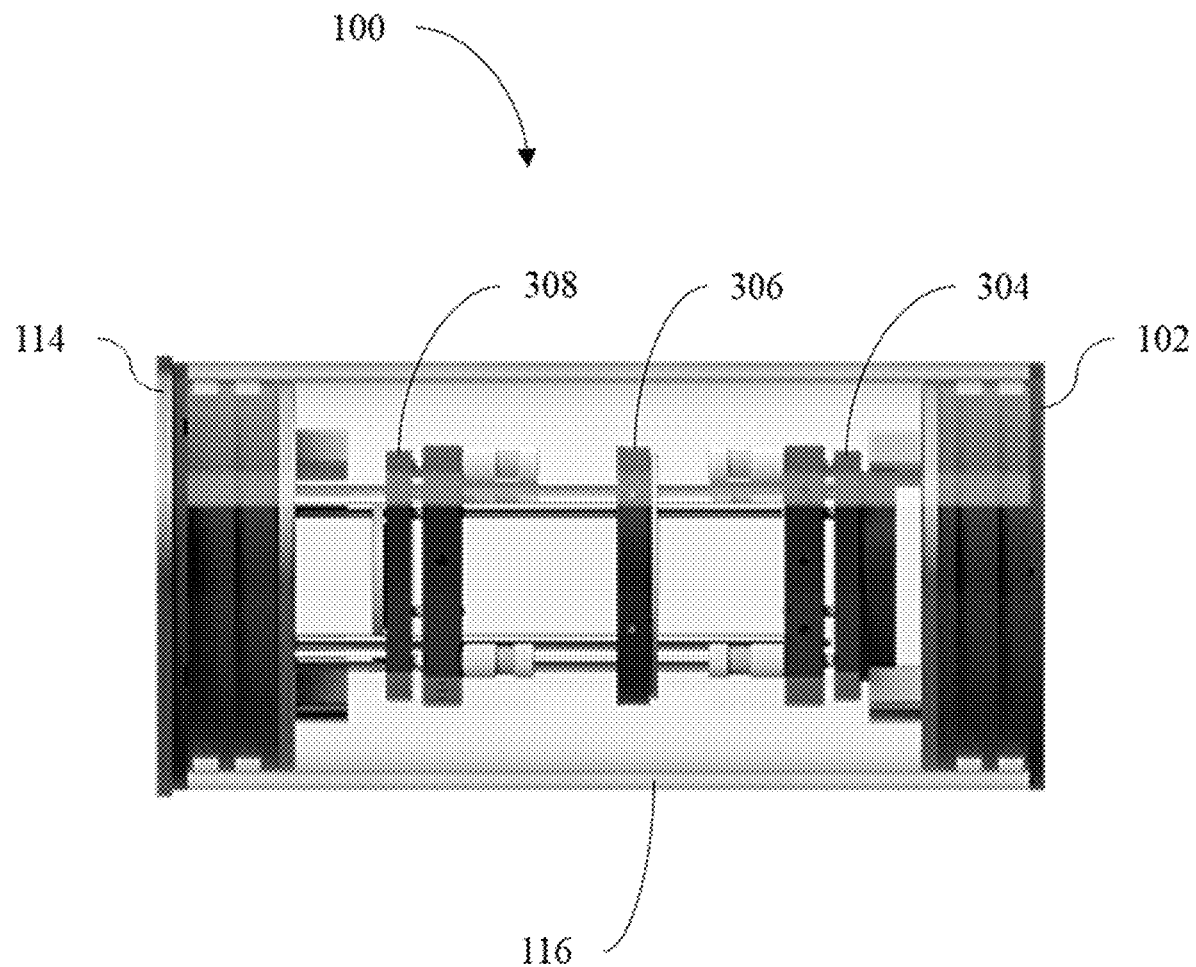
FIG. 3 is a side view of another example of the digital adaptive optics encoder module disclosed herein.

Referring now to FIG. 3, a side view of another example of the digital adaptive optics encoder module 100 is shown. Similar to FIG. 1, the digital adaptive optics encoder module 100 in FIG. 3 includes an input mounting flange 102 and an output mounting flange 114. The input mounting flange 102 and the output mounting flange 114 are the same input mounting flange 102 and the output mounting flange 114 as previously disclosed herein. Additionally, the digital adaptive optics encoder module 100 includes digital adaptive optic elements 108 such as a primary aperture 304, an optical spreader 306, and a secondary aperture plane in a non-redundant array with a focusing optic 308. A housing 116 is also shown in FIG. 3 that encloses all the interior components of the digital adaptive optics encoder module 100.

Figure 4:
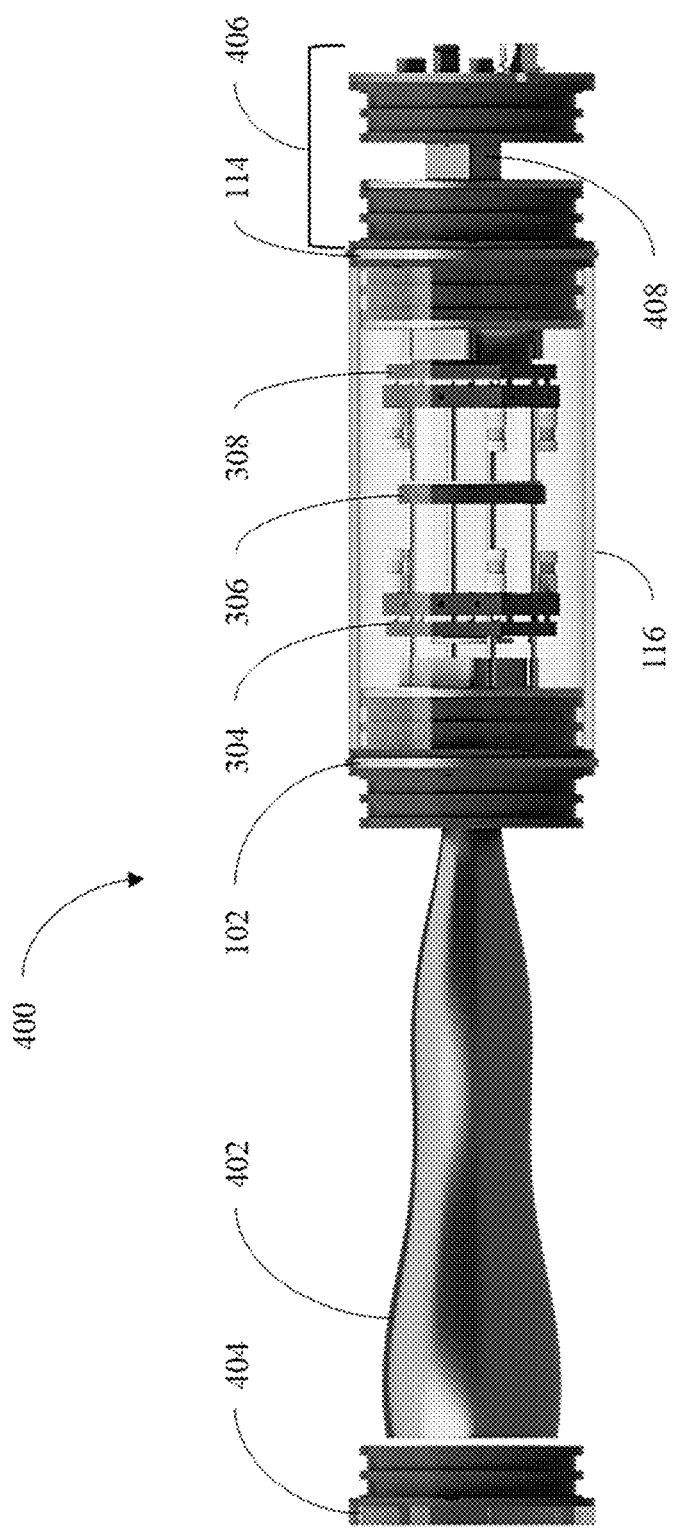
FIG. 4 is an interior side view of an example of the digital adaptive optics encoder module with a camera module attached.

Referring to FIG. 4, an interior side view 400 of another example of the digital adaptive optics encoder module 100 with a camera module attached is shown. FIG. 4 includes the same an input mounting flange 102, an output mounting flange 114, primary aperture 304, optical spreader 306, a secondary aperture plane in a non-redundant array with a focusing optic 308, and housing 116 as previously disclosed herein. FIG. 4 also shows a telescope 402 attached to the digital adaptive optics encoder module 100 through the input mounting flange 102. The telescope 402 also includes an endcap 404 that protects the end of the telescope 402 from damage and dust. In the example in FIG. 4, a camera module 406 with an FLIR sensor 408 is also included. The camera module 406 may or may not have an FLIR sensor 408. The FLIR sensor 408 can also be an example of a standalone sensor module as previously disclosed herein. The FLIR sensor 408 in this example is used to create an infrared image of the target.

Figure 5:
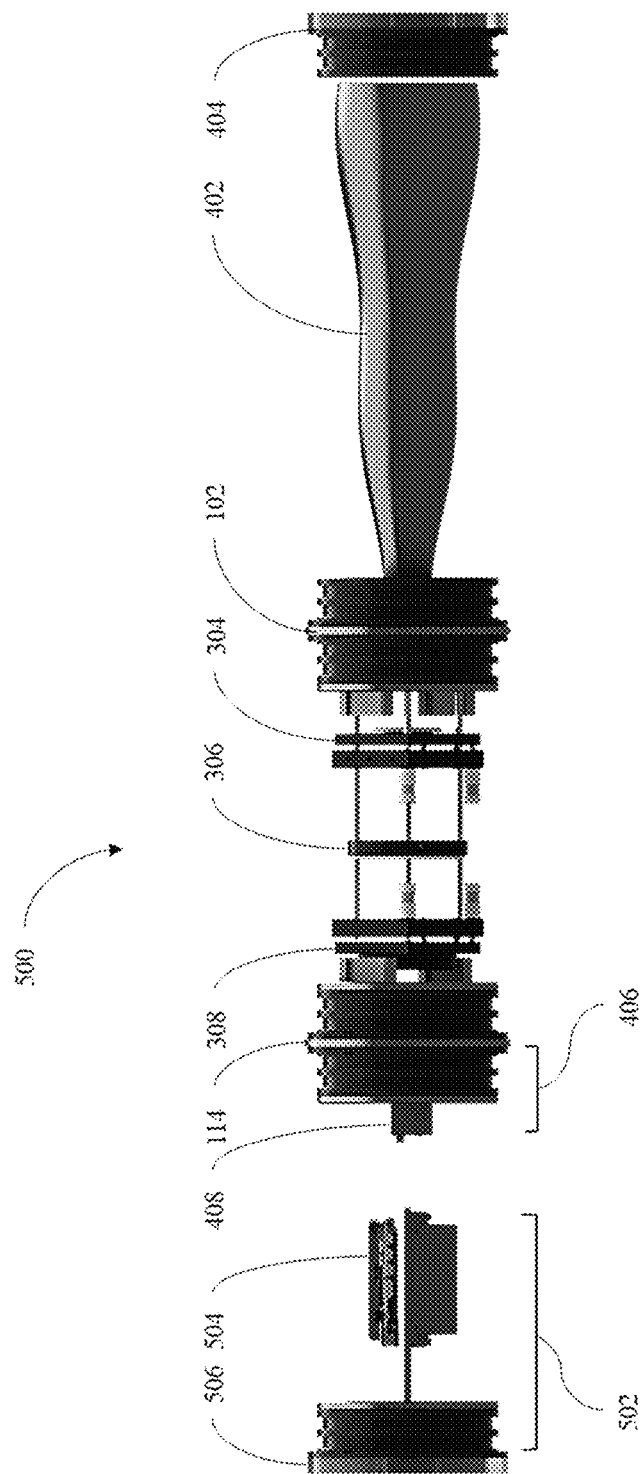
FIG. 5 is an interior side view of an example of a telescope attached to the digital adaptive optics encoder module, a camera module, and a data acquisition module.

Referring to FIG. 5, an interior side view 500 of another example of a telescope attached to the digital adaptive optics encoder module 100, which includes a camera module and a data acquisition module. FIG. 5 includes the same an input mounting flange 102, an output mounting flange 114, primary aperture 304, optical spreader 306 a secondary aperture plane in a non-redundant array with a focusing optic 308, telescope 402, endcap 404, camera module 406, and FLIR sensor 408 as previously described herein. However, the camera module 406 and FLIR sensor 408 are enclosed with a data acquisition module 502 to form a data acquisition and camera module. In this example, the data acquisition module 502 includes an embedded computer 504, which can save raw data, perform diagnostic analysis, perform the reconstruction of the digitized frame as a post-process, or a combination thereof. The data acquisition module 502 also includes an integrated display endcap 506. The integrated display endcap 506 preforms various functions, such as enabling system output, monitoring, debugging, etc.

Figure 6:
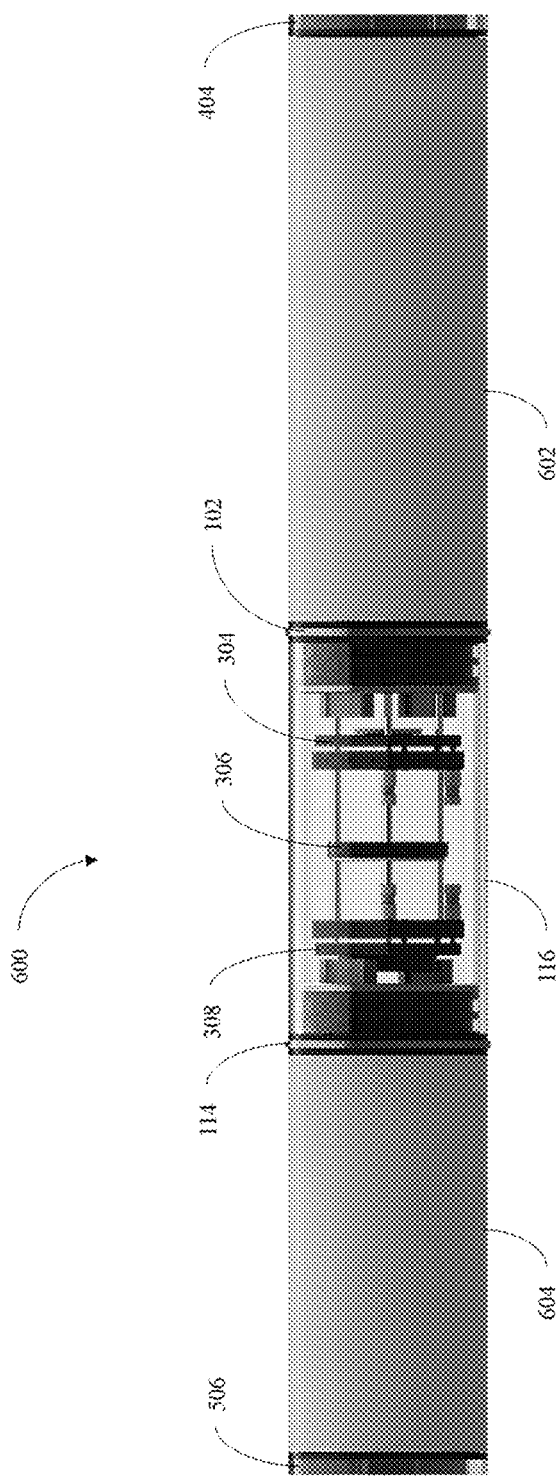
FIG. 6 is an exterior side view of an example of a telescope attached to the digital adaptive optics encoder module, a camera module, and a data acquisition module.

FIG. 6 is an exterior side view 600 of the example of a telescope attached to the digital adaptive optics encoder module 100, a camera module, and a data acquisition module is shown. FIG. 6 is the same example as shown in FIG. 5 with the same components. However, the interior components in FIG. 6 are covered by a telescope housing 602 and a housing 604 for the camera module 406 and data acquisition module 502. The telescope housing 602 and housing 604 can be made of the same material and same size as previously disclosed herein for the digital adaptive optics encoder module housing 116.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 40 nm to about 100 nm should be interpreted to include not only the explicitly recited limits of from about 40 nm to about 100 nm, but also to include individual values, such as 45 nm, 77 nm, 95 nm, etc., and sub-ranges, such as from about 55 nm to about 85 nm, etc.

In describing and claiming the examples disclosed herein, the singular forms "a", "an" and "the" include plural referents unless the context clearly dictates otherwise.

What is claimed is:

1. A digital adaptive optics encoder module, comprising:
   an input mounting flange, wherein the input mounting flange is a mount capable of attaching to a telescope;
   a collimating lens, wherein the collimating lens is capable of expanding light from a target to fill a plurality of primary apertures;
   a bandpass filter having a bandwidth ranging from about 40 nm to about 100 nm;
   digital adaptive optic elements, wherein the digital adaptive optic elements include:
   i) the plurality of primary apertures for receiving light from the collimating lens;
   ii) an optical spreader for spreading apart the light passing through the primary apertures by at least a factor of two times a baseline separation of the primary apertures, wherein the optical spreader includes a plurality of actuators for modifying path lengths within the digital adaptive optic elements through the primary apertures to a detector;
   iii) a focusing optic for focusing the light from the optical spreader at the detector; and
   iv) the detector for detecting an image of the target with the light from the focusing optic;
   refocusing lens, wherein the refocusing lens is capable of refocusing an output from the digital adaptive optic elements onto a sensor plane;
   output mounting flange, wherein the output mounting flange is a mount capable of attaching to an output connection; and
   a housing, wherein the housing encloses the collimating lens, the bandpass filter, the digital adaptive optic encoder elements, and the refocusing lens.

2. The digital adaptive optics encoder module of claim 1 further including a first relay lens and a second relay lens, wherein the first relay lens is located between the input mounting flange and the collimating lens and the second relay lens is located between the refocusing lens and the output mounting flange.

3. The digital adaptive optics encoder module of claim 2, wherein the first relay lens adjusts a scale of an input aperture diameter by demagnifying the target to fill the digital adaptive optic elements and the second relay lens matches or exceeds the input aperture diameter of the digital adaptive optics encoder module.

4. The digital adaptive optics encoder module of claim 1, wherein the input mounting flange is attached to the telescope is a telephoto zoom lens that has a focal length ranging from about 900 mm to about 2100 mm.

5. The digital adaptive optics encoder module of claim 1, wherein the output mounting flange is attached to the output connection that includes a processing module and an output connection module selected from the group consisting of a camera module, a data acquisition module, a sensor module, a focusing element module, and combinations thereof.

6. The digital adaptive optics encoder module of claim 5, wherein the output connection generates a digital image of the target.

7. The digital adaptive optics encoder module of claim 1, wherein the output mounting flange is attached to a sensor module that records a raw intensity of the target and stores the raw intensity of the target as data.

8. The digital adaptive optics encoder module of claim 1, wherein the refocusing lens is a 1-inch diameter plano-concave lens with a −75 mm focal length.

9. A digital adaptive optics encoder module, comprising:
a telescope for receiving target light;
an input mounting flange attached to the telescope;
a collimating lens, wherein the collimating lens is capable of expanding the target light to fill a plurality of primary apertures;
a bandpass filter, having a bandwidth ranging from about 40 nm to about 100 nm, for receiving the expanded target light and outputting bandpass light;
digital adaptive optic elements for receiving bandpass light, wherein the digital adaptive optic elements include:
i) the plurality of primary apertures for receiving the bandpass light;
ii) an optical spreader for spreading apart the light passing through the primary apertures by at least a factor of two times a baseline separation of the primary apertures, wherein the optical spreader includes a plurality of actuators for modifying path lengths within the digital adaptive optic elements through the primary apertures to a detector;
iii) a focusing optic for focusing the light from the optical spreader at the detector; and
iv) the detector for detecting an image of the target from the focusing optic;
a refocusing lens, wherein the refocusing lens is capable of refocusing an output from the digital adaptive optic elements onto a sensor plane;
an output mounting flange, wherein the output mounting flange is a mount capable of attaching to an output connection; and
a housing, wherein the housing encloses the collimating lens, the bandpass filter, the digital adaptive optic encoder elements, and the refocusing lens.

10. The digital adaptive optics encoder module of claim 9, further including two relay lens systems, wherein a first relay lens system is located between the input mounting flange and the collimating lens and a second relay lens system is located between the refocusing lens and the output mounting flange.

11. The digital adaptive optics encoder module of claim 10, further adjusting a scale of an input aperture size by demagnifying the target to fill the digital adaptive optic elements the second relay lens matches or exceeds an input aperture diameter of the digital adaptive optics encoder module.

12. The digital adaptive optics encoder module of claim 9, wherein the telescope is a telephoto zoom lens that has a focal length ranging from about 900 mm to about 2100 mm.

13. The digital adaptive optics encoder module of claim 9, wherein the output mounting flange is attached to the output connection that includes a processing module and an output connection module selected from the group consisting of a camera module, a data acquisition module, a sensor module, a focusing element module, and combinations thereof.

14. The digital adaptive optics encoder module of claim 9, wherein the output mounting flange is attached to a sensor module that records a raw intensity of the target and stores the raw intensity of the target as data.

15. The digital adaptive optics encoder module of claim 9, wherein the refocusing lens is a 1 inch diameter plano-concave lens with a −75 mm focal length.

16. A digital adaptive optics encoder module, comprising:
an input mounting flange, wherein the input mounting flange is a mount capable of attaching to a telescope;
a first relay lens, wherein the first relay lens adjusts a scale of an input aperture diameter by demagnifying the target to fill an input aperture of the digital adaptive optic elements;
a collimating lens, wherein the collimating lens is capable of expanding light from the first relay lens to fill a plurality of primary apertures;
a bandpass filter for receiving light from the collimating lens having a bandwidth ranging from about 40 nm to about 100 nm;
digital adaptive optic elements for receiving light from the bandpass filter, wherein the digital adaptive optic elements include:
i) the plurality of primary apertures for receiving light from the target;
ii) an optical spreader for spreading apart the light passing through the primary apertures by at least a factor of two times a baseline separation of the primary apertures, wherein the optical spreader includes a plurality of actuators for modifying path lengths within the digital adaptive optic elements through the primary apertures to a detector;
iii) a focusing optic for focusing the light from the optical spreader at the detector; and
iv) the detector for detecting an image of the target with the light from the focusing optic;
a refocusing lens, wherein the refocusing lens is capable of refocusing an output from the digital adaptive optic elements onto a sensor plane;
a second relay lens for receiving light from the refocusing lens, wherein the second relay lens matches or exceeds the input aperture diameter of the digital adaptive optics encoder module;
an output mount flange, wherein the output mounting flange is a mount capable of attaching to an output connection; and
a housing, wherein the housing encloses the first relay lens, the collimating lens, the bandpass filter, the digital adaptive optic encoder elements, the refocusing lens, and the second relay lens.

17. The digital adaptive optics encoder module of claim 16, wherein the telescope comprises a telephoto zoom lens having a focal length ranging from about 900 mm to about 2100 mm.

18. The digital adaptive optics encoder module of claim 16, wherein the output mounting flange is attached to the output connection that includes a processing module and an output connection module selected from the group consisting of a camera module, a data acquisition module, a sensor module, a focusing element module, and combinations thereof.

19. The digital adaptive optics encoder module of claim 16, wherein the output mounting flange is attached to a sensor module that records a raw intensity of the target and stores the raw intensity of the target as data.

20. The digital adaptive optics encoder module of claim 16, wherein the refocusing lens is a 1-inch diameter plano-concave lens with a −75 mm focal length.

\* \* \* \* \*